(12) United States Patent
Hsueh (10) Patent No.: US 11,449,155 B2
(45) Date of Patent: Sep. 20, 2022

(54) CONTROL METHOD OF IMMERSIVE SYSTEM

(71) Applicant: HTC Corporation, Taoyuan (TW)

(72) Inventor: You-Lung Hsueh, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/647,468

(22) Filed: Jan. 10, 2022

(65) Prior Publication Data

US 2022/0221946 A1 Jul. 14, 2022

Related U.S. Application Data

(60) Provisional application No. 63/135,753, filed on Jan. 11, 2021.

(51) Int. Cl.
*G06F 3/0346* (2013.01)
*G06F 3/01* (2006.01)

(52) U.S. Cl.
CPC .......... *G06F 3/0346* (2013.01); *G06F 3/011* (2013.01); *G06F 3/017* (2013.01)

(58) Field of Classification Search
CPC ......... G06F 3/011; G06F 3/017; G06F 3/0346
See application file for complete search history.

(56) References Cited

U.S. PATENT DOCUMENTS

| | | | | |
|---|---|---|---|---|
| 10,134,178 | B2 * | 11/2018 | Sebastian | G06T 1/20 |
| 10,565,731 | B1 * | 2/2020 | Reddy | G06F 3/012 |
| 10,636,170 | B1 * | 4/2020 | Reddy | G06F 3/012 |
| 10,664,993 | B1 * | 5/2020 | Reddy | G06T 7/75 |
| 10,679,378 | B1 * | 6/2020 | Reddy | G06T 7/73 |
| 2014/0009384 | A1 * | 1/2014 | Valik | A63F 13/213 345/156 |
| 2016/0232715 | A1 * | 8/2016 | Lee | G06F 3/011 |
| 2017/0091983 | A1 * | 3/2017 | Sebastian | G06F 3/0346 |
| 2017/0316582 | A1 * | 11/2017 | Chen | H04N 5/247 |

* cited by examiner

*Primary Examiner* — Michael Pervan
(74) *Attorney, Agent, or Firm* — CKC & Partners Co., LLC (57) ABSTRACT

A control method for an immersive system includes following steps. Raw pose data of a controller is tracked. The controller is configured to operate in one of controller modes. A current controller mode is determined among the controller modes. A target pose transform matrix is selected from a plurality of pose transform matrices according to the current controller mode. Each of the pose transform matrices is provided corresponding to one of the controller modes respectively. The target pose transform matrix is applied onto the raw pose data to generate adjusted pose data. A virtual object under the current controller mode in an immersive content is rendered according to the adjusted pose data.

20 Claims, 8 Drawing Sheets

CONTROL METHOD OF IMMERSIVE SYSTEM

RELATED APPLICATIONS

This application claims the priority benefit of U.S. Provisional Application Ser. No. 63/135,753, filed Jan. 11, 2021, which is herein incorporated by reference.

BACKGROUND

Field of Invention

The disclosure relates to a control method of an immersive system. More particularly, the disclosure relates to the control method about how to track a device and determine pose data of the device in the immersive system.

Description of Related Art

Virtual Reality (VR), Augmented Reality (AR), Substitutional Reality (SR), and/or Mixed Reality (MR) devices are developed to provide immersive experiences to users. When a user wearing a head-mounted device, the visions of the user will be covered by the immersive content shown on the head-mounted device. The immersive content shows a virtual background and some virtual objects in an immersive scenario.

In some cases, the user may hold a controller as an input device. In order to provide an immersive experience to the user, an immersive system is required to track a movement of the controller and render the controller in the immersive content. In this case, the user can manipulate the controller (e.g., can be simulated as a sword) to interact with the virtual objects in the immersive scenario. For example, the user can swing the virtual sword against a virtual monster in the immersive scenario.

SUMMARY

The disclosure provides a control method, which includes following steps. Raw pose data of a controller is tracked. The controller is configured to operate in one of controller modes. A current controller mode is determined among the controller modes. A target pose transform matrix is selected from a plurality of pose transform matrices according to the current controller mode. Each of the pose transform matrices is provided corresponding to one of the controller modes respectively. The target pose transform matrix is applied onto the raw pose data to generate adjusted pose data. A virtual object under the current controller mode in an immersive content is rendered according to the adjusted pose data.

The disclosure provides an immersive system, which includes a controller, a tracking device and a processing unit. The controller is configured to operate in one of a plurality of controller modes. The tracking device is configured for tracking raw pose data of the controller. The processing unit is communicated with the tracking device. The processing unit is configured to determine a current controller mode among the controller modes. The processing unit is configured to select a target pose transform matrix from a plurality of pose transform matrices according to the current controller mode. Each of the pose transform matrices is provided corresponding to one of the controller modes respectively. The processing unit is configured to apply the target pose transform matrix onto the raw pose data to generate adjusted pose data. The processing unit is configured to render a virtual object, under the current controller mode in an immersive content, according to the adjusted pose data.

The disclosure provides a non-transitory computer-readable storage medium, storing at least one instruction program executed by a processor to perform a control method, which includes following steps. Raw pose data of a controller is tracked. The controller is configured to operate in one of controller modes. A current controller mode is determined among the controller modes. A target pose transform matrix is selected from a plurality of pose transform matrices according to the current controller mode. Each of the pose transform matrices is provided corresponding to one of the controller modes respectively. The target pose transform matrix is applied onto the raw pose data to generate adjusted pose data. A virtual object under the current controller mode in an immersive content is rendered according to the adjusted pose data.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
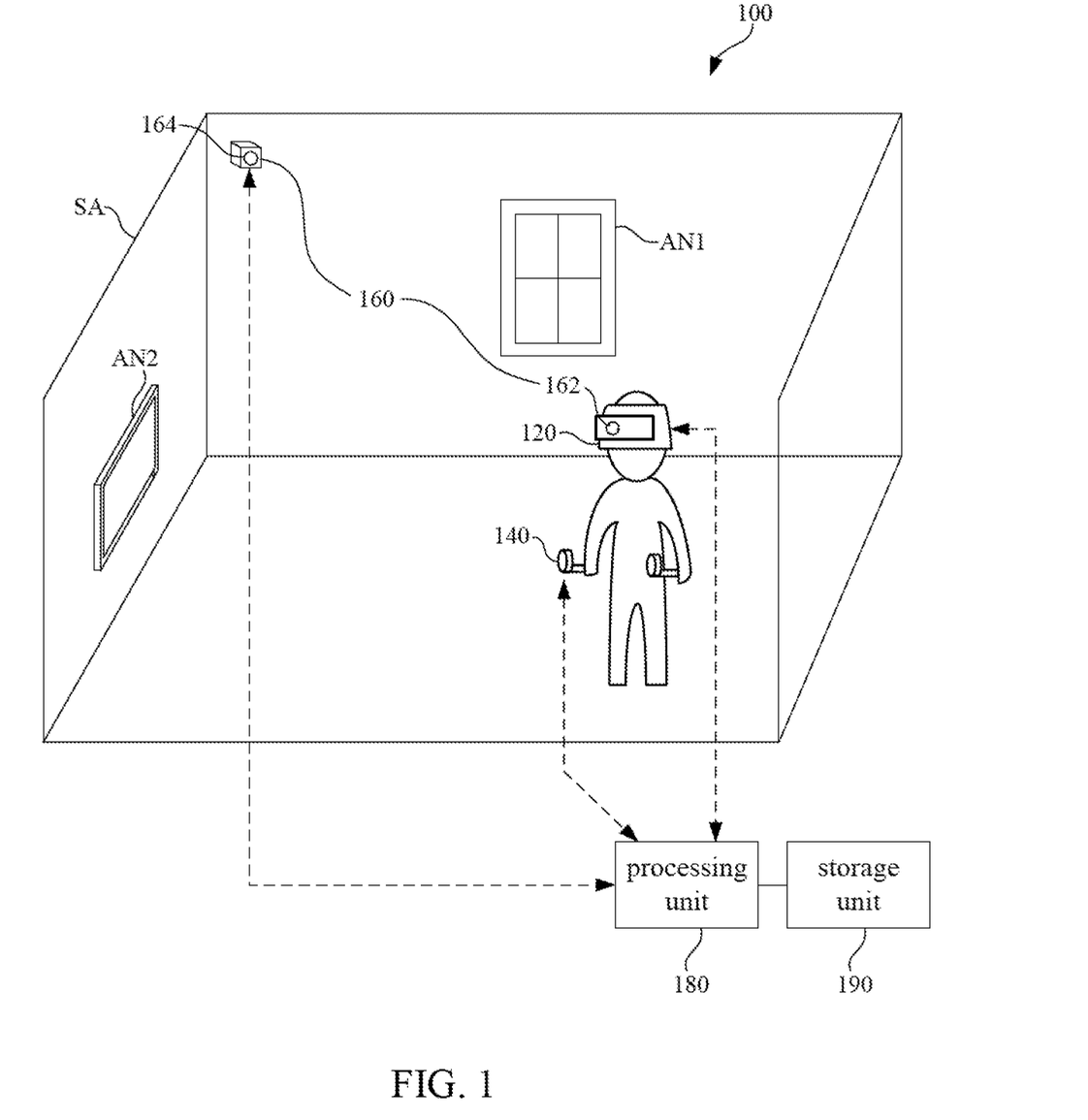
FIG. 1 is a schematic diagram illustrating an immersive system according to an embodiment of this disclosure.

Reference is made to FIG. 1, which is a schematic diagram illustrating an immersive system 100 according to an embodiment of this disclosure. As shown in FIG. 1, the immersive system 100 includes a head-mounted device 120 and a controller 140 located in a spatial area SA. For example, the spatial area SA as shown in FIG. 1 can be a bedroom or a conference room in the real world, but the disclosure is not limited thereto. In some other embodiments, the spatial area SA can also be a specific area at an outdoor space (not shown in figures).

In some embodiments, the head-mounted device 120 can be wear on the head of the user U1, and the controller 140 can be a handheld controller which is hold in one hand of the user U1. The user carrying the head-mounted device 120 and the controller 140 may move to different positions and face toward various directions in the spatial area SA. In some embodiments, the immersive system 100 includes a tracking device 160, a processing unit 180 and a storage unit 190. The tracking device 160 is configured to track a movement and a rotation about the head-mounted device 120 and the controller 140. The processing unit 180 is communicated with the tracking device 160 and the storage unit 190. The processing unit 180 is configured to perform a control method to track and render the controller 140.

In some embodiments, the head-mounted device 120 can provide immersive contents, such as a Virtual Reality (VR), an Augmented Reality (AR), a Substitutional Reality (SR) and/or a Mixed Reality (MR) scenario, to the user U1. In order to provide the immersive contents to the users U1, the immersive system 100 is configured to track the head-mounted device 120 for detecting the position and the rotation of user's movement, and also track the controller 140 for detecting the position and the rotation of user's hand gestures.

In some embodiments, the tracking device 160 as shown in FIG. 1 can include at least one camera 162 disposed on the head-mounted device 120. The camera 162 is able to track the head-mounted device 120 by an inside-out tracking function, which is capable of observing some objects (e.g., anchor objects AN1 and AN2 as shown in FIG. 1) in the spatial area SA from a view of the head-mounted device 120. In some embodiments, the tracking device 160 (or cooperated with the processing unit 180) may utilize a Simultaneous Localization and Mapping (SLAM) algorithm to construct the map of an unknown environment (e.g., the spatial area SA) while simultaneously tracking the head-mounted device 120 within the unknown environment.

In some other embodiments, the tracking device 160 as shown in FIG. 1 can include at least one tracking station 164 disposed at a fixed point in the spatial area SA. For example, the tracking station is disposed at a corner near a ceiling of the room shown in FIG. 1. In some embodiments, the tracking station is a component for providing an outside-in tracking function, which is capable of tracking the head-mounted device 120 from an outside point of view so as to detect an outside-in pose data about the head-mounted device 120.

It is noticed that, embodiments in FIG. 1 shows both of the inside-out tracking function (based on the camera 162) and the outside-in tracking function (based on the tracking station 164). However, the immersive system 100 is not limited to include both of the inside-out tracking function and the outside-in tracking function. In other words, the tracking device 160 can be realized by at least one of the inside-out tracking function (based on the camera 162) and the outside-in tracking function (based on the tracking station 164). In addition, the camera 162 and the tracking station 164 are illustrated for demonstration, and the tracking device 160 can be implemented by other similar tracking components, such as ultrasound trackers, infrared trackers and/or image-based trackers.

In some other embodiments, the tracking device 160 further includes an inertial measurement unit (not shown in figures) or a gravity sensor (not shown in figures) disposed in the head-mounted device 120 and/or the controller 140. The inertial measurement unit or the gravity sensor can provide rotation information about the head-mounted device 120 and/or the controller 140, so as to increase a tracking preciseness and save a computation resource in tracking the head-mounted device 120 and/or the controller 140.

Figure 2:
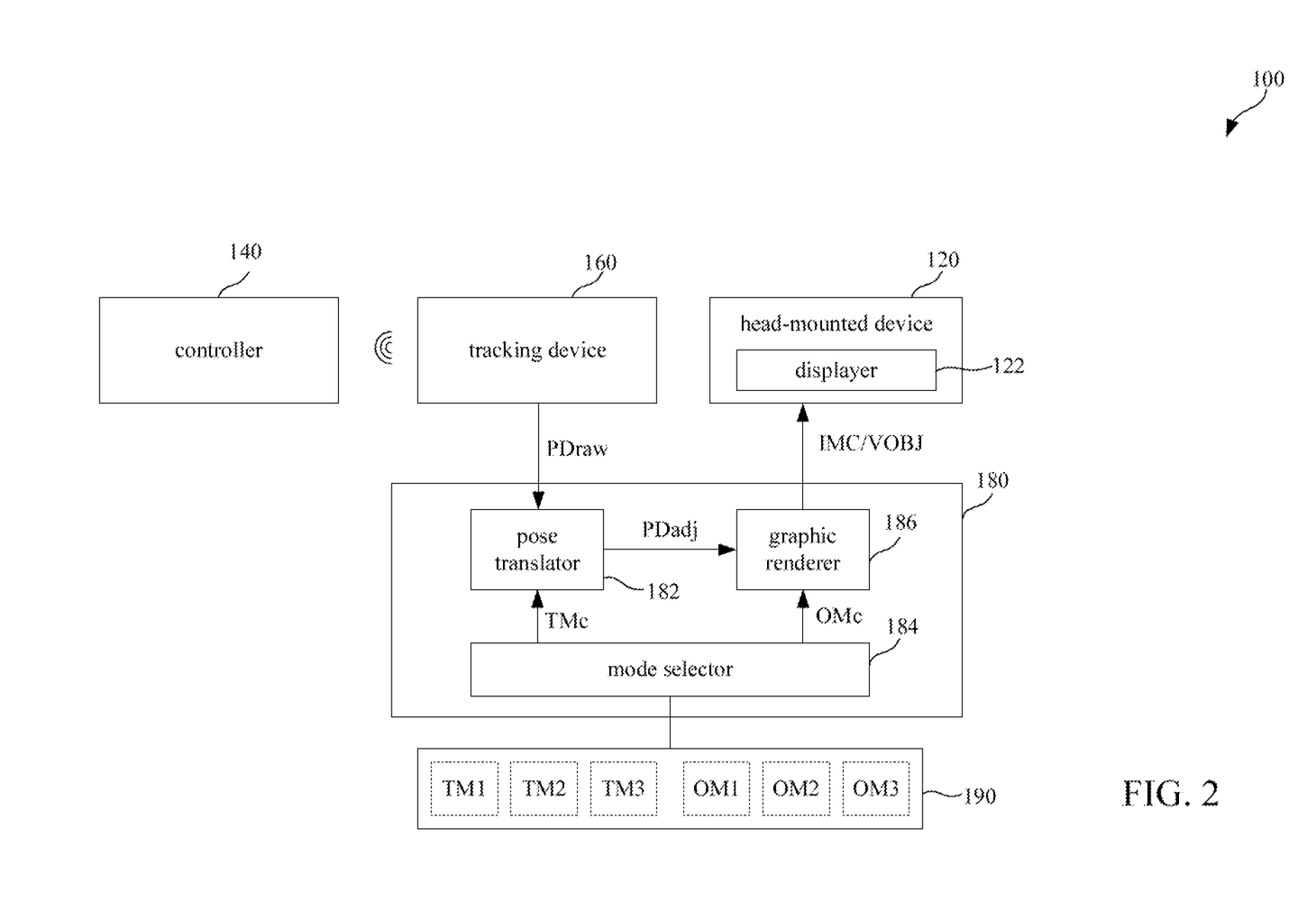
FIG. 2 is a functional block diagram of the immersive system in FIG. 1 according to some embodiments of the disclosure.

Reference is further made to FIG. 2, which is a functional block diagram of the immersive system 100 in FIG. 1 according to some embodiments of the disclosure. In some embodiments, the tracking system 100 includes a processing unit 180. The processing unit 180 is able to provide an immersive content IMC to the user U1. In some embodiments, the immersive content IMC can be transmitted to the head-mounted device 120 and displayed on a displayer 122 of the head-mounted device 120. In some embodiments, the displayer 122 will cover a field of view of the user U1, such that the user U1 can feel an immersive experience as being inside a virtual scenario in the immersive content IMC.

In some embodiments, the processing unit 180 can be a processor in a computer separated from the head-mounted device 120 and the tracking station 160. In some other embodiments, the processing unit 180 can be implemented by a processor or an application specific integrated circuit (ASIC) integrated in the head-mounted device 120 or the tracking station 160. The storage unit 190 can be implemented by a hard-drive, a flash memory, a memory or other data storage component.

In the immersive experience, the user U1 would like to interact with items (e.g., a rabbit, an enemy or a door) inside the immersive content IMC. In the embodiments, the user U1 can manipulate the controller 140 to interact with the immersive content IMC. A position and an orientation of the controller 140 are also tracked by the tracking device 160, so as to fulfill aforesaid interactions.

According to a tracking result of the controller 140, the controller 140 can be rendered by the processing unit 180 and appeared at a specific position along a specific direction in the immersive content IMC. Based on different applications (e.g., a shooting game, a fighting game, a virtual travel experience, a social networking experience), the controller 140 can be operated in different controller modes and correspondingly rendered as different virtual objects VOBJ (such as a sword, a stick, a pistol, a holding bar or a keyboard) in the immersive content IMC. For example, the controller 140 can be operated in three different controller modes, such as a trigger oriented mode, a handle oriented mode and a panel oriented mode. Details about how to render the virtual objects VOBJ based on different controller modes will be discussed in following paragraphs.

Figure 3:
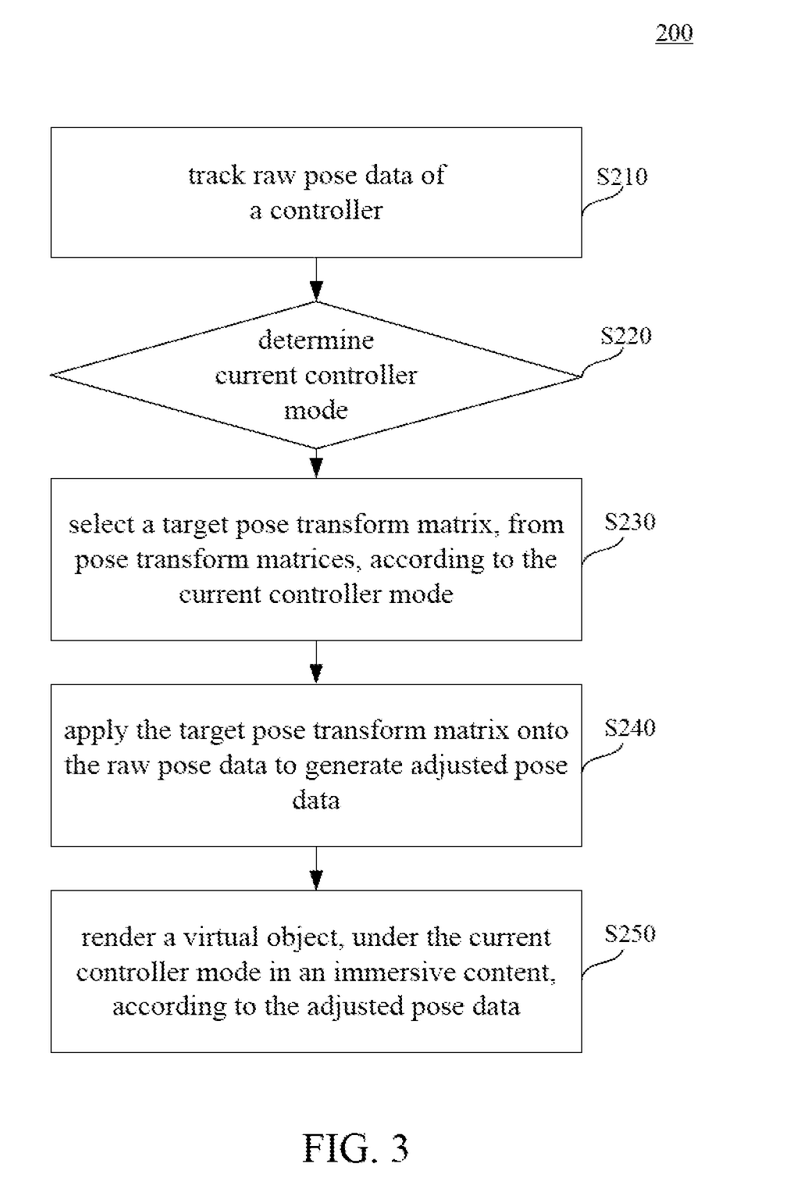
FIG. 3 is a flowchart illustrating a control method according to some embodiments of the disclosure.

Reference is further made to FIG. 3, which is a flowchart illustrating a control method 200 according to some embodiments of the disclosure. The control method 200 can be executed by the immersive system 100 shown in FIG. 1 and FIG. 2. As shown in FIG. 2 and FIG. 3, in step S210, the tracking device 160 is configured to track raw pose data PDraw of the controller 140. As shown in FIG. 1, the controller 140 is held by the user U1 and is movable within the spatial area SA along with the hand movement. The raw pose data PDraw is configured to define a position and an orientation of the controller 140 observed by a tracking device 160 in the spatial area SA.

Figure 4:
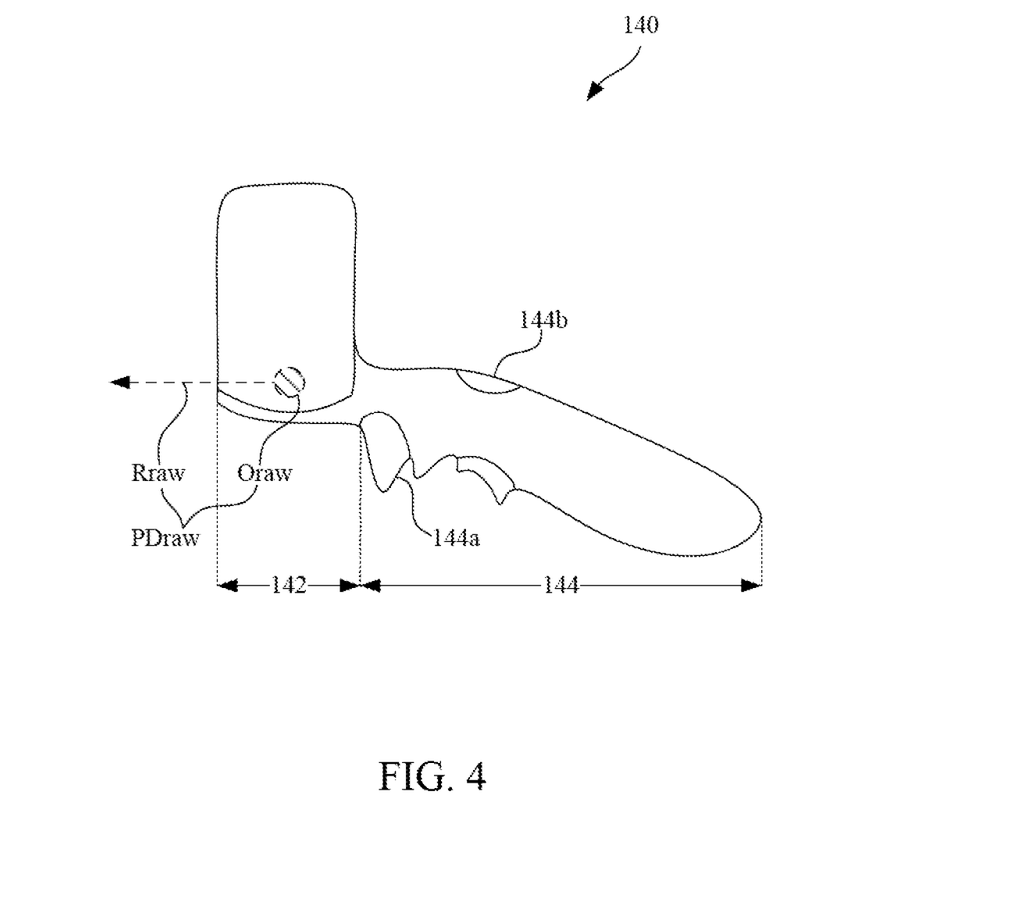
FIG. 4 is a schematic diagram illustrating the raw pose data about the controller according to some embodiments of the disclosure.

Reference is further made to FIG. 4, which is a schematic diagram illustrating the raw pose data PDraw about the controller 140 according to some embodiments of the disclosure. As the embodiment shown in FIG. 4, the controller 140 includes a head portion 142 and a handle portion 144. In some cases, the controller 140 further includes a trigger button 144a and a touch panel 144b disposed on the handle portion 144. The user U1 can operate the trigger button 144a and the touch panel 144b to generate some input signals. The appearance and the hardware configuration about the controller 140 shown in FIG. 4 are illustrated for demonstration, and the disclosure is not limited thereto.

In some embodiments, the raw pose data PDraw includes a position (can be represented by three-dimension coordinates) about a tracking origin Oraw of the controller 140 and an orientation (can be represented by a three-dimension vector) about a tracking axis Rraw of the controller 140 observed by the tracking device 160.

In some embodiments, the raw pose data PDraw of the controller 140 is tracked in view of the tracking device 160. For example, the controller 140 can be tracked based on an appearance feature (e.g., a printed pattern, a ring shape structure or a light-emitting pattern, not shown in figures) on the head portion 142, such that the tracking origin Oraw is configured at the bottom of the head portion 142. The raw pose data PDraw in FIG. 4 shows a default position of the tracking origin Oraw of the controller 140 and a default orientation about the tracking axis Rraw of the controller 140. In the default configuration, the tracking axis Rraw is configured to point a forward direction when the head portion 142 is located straight up and the handle portion 144 is lifted slightly upward.

The position about the tracking origin Oraw of the controller 140 and the orientation about the tracking axis Rraw of the controller 140 will vary corresponding to the user's hand movement. On the other hand, the tracking origin Oraw and the tracking axis Rraw are substantially fixed or permanently set relative to the controller 140.

In some embodiments, the tracking origin Oraw and the tracking axis Rraw of the controller 140 defined in the raw pose data PDraw are designed by a manufacturer of the controller 140 or the tracking device 160. The tracking origin Oraw and the tracking axis Rraw are designed to at the most recognizable position and axis according to the shape of the controller 140, so as to increase preciseness in tracking the controller 140.

As shown in FIG. 2 and FIG. 3, in step S220, a mode selector 184 of the processing unit 180 is configured to determine a current controller mode among the controller modes. For example, the controller modes can includes the trigger oriented mode, the handle oriented mode and the panel oriented mode. In some embodiments, the current controller mode is selected from these controller modes according to an application program executed on the immersive system 100. For example, if the user U1 is currently playing a shooting game, the current controller mode can be determined as the trigger oriented mode (for simulating a pistol); if the user U1 is currently playing a baseball game, the current controller mode can be determined as the handle oriented mode (for simulating a baseball bat).

Figure 5:
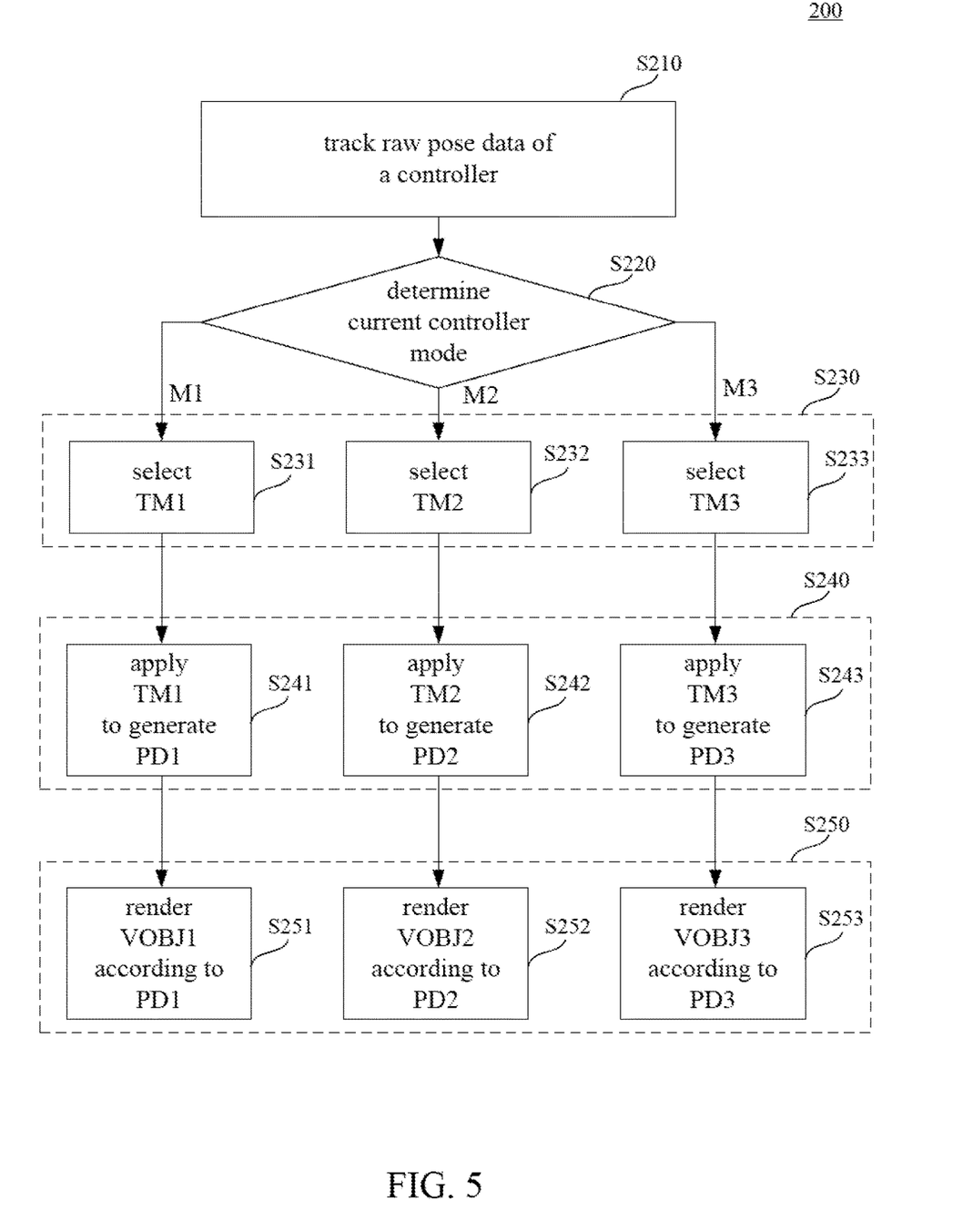
FIG. 5, which is a flow chart illustrating the control method in FIG. 3 according to a demonstrational example of the disclosure.

In some cases, the raw pose data PDraw generated in S210 by the tracking device 160 is not optimized to simulate different types of the controller 140 in every controller modes. In step S220, a mode selector 184 of the processing unit 180 is configured to determine a current controller mode among the controller modes. Reference is further made to FIG. 5, which is a flow chart illustrating the control method 200 in FIG. 3 according to a demonstrational example of the disclosure. As shown in FIG. 5, in the demonstrational example, the controller modes can includes the trigger oriented mode M1, the handle oriented mode M2 and the panel oriented mode M3.

In some embodiments, the mode selector 184 can be implemented by program instruction codes executed by the processing unit 180 or an application specific integrated circuit.

In some embodiments, as shown in FIG. 2 and FIG. 5, the current controller mode is selected from these controller modes (M1-M3) according to an application program executed on the immersive system 100. For example, if the user U1 is currently playing a shooting game, the current controller mode can be determined as the trigger oriented mode M1 (for simulating a pistol); if the user U1 is currently playing a baseball game, the current controller mode can be determined as the handle oriented mode M2 (for simulating a baseball bat); if the user U1 is currently typing a message, the current controller mode can be determined as the panel oriented mode M3 (for simulating a keyboard).

In step S230, the mode selector 184 of the processing unit 180 is configured to select a target pose transform matrix TMc, from pose transform matrices TM1~TM3, according to the current controller mode. In some embodiments, each of the pose transform matrices TM1~TM3 are provided corresponding to one of the controller modes (e.g., the trigger oriented mode M1, the handle oriented mode M2 and the panel oriented mode M3) respectively. Details about the pose transform matrices TM1~TM3 will be discussed in following paragraphs.

Figure 6A:
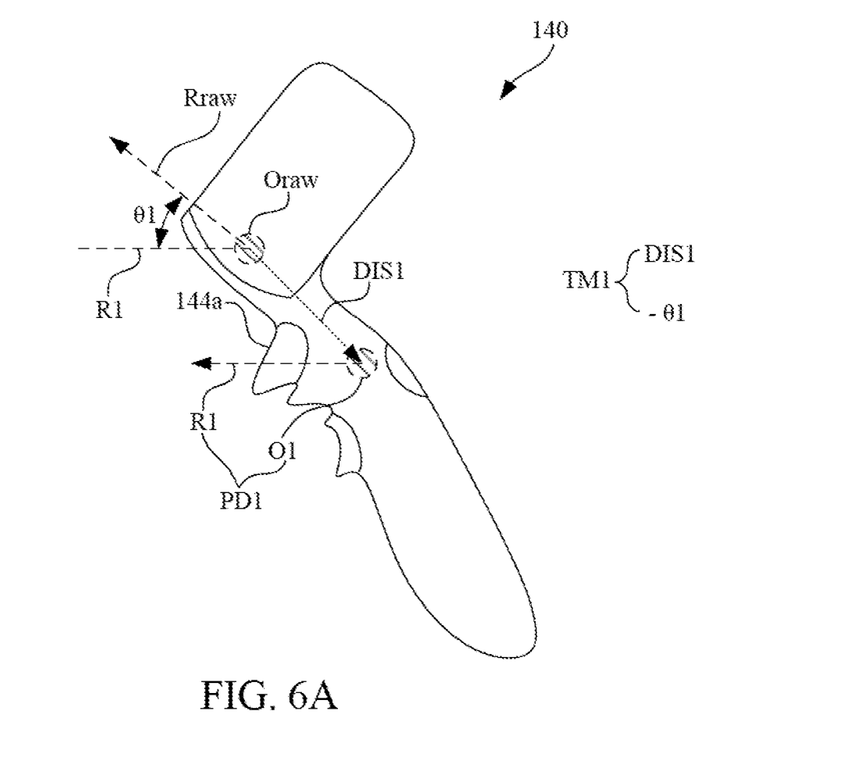
FIG. 6A is a schematic diagram illustrating the pose transform matrix corresponding to the trigger oriented mode in some embodiments of the disclosure.

As shown in FIG. 2 and FIG. 5, if the current controller mode is the trigger oriented mode M1, the step S231 is executed, and the mode selector 184 of the processing unit 180 selects the pose transform matrix TM1 corresponding to the trigger oriented mode M1. Reference is further made to FIG. 6A. FIG. 6A is a schematic diagram illustrating the pose transform matrix TM1 corresponding to the trigger oriented mode M1 in some embodiments of the disclosure. As shown in FIG. 5 and FIG. 6A, in step S241, a pose translator 182 is configured to apply the pose transform matrix TM1 onto the raw pose data PDraw (including the tracking origin Oraw and the tracking axis Rraw), so as to translate the raw pose data PDraw into adjusted pose data PD1, which include a virtual origin O1 and a virtual axis R1. The target pose transform matrix TMc (i.e., the pose transform matrix TM1 in this case) is configured to convert the position of the tracking origin Oraw within the raw pose data PDraw into another position of the virtual origin O1 in the adjusted pose data by shifting a displacement DIS1, and also convert the orientation of the tracking axis Rraw in the raw pose data PDraw into another orientation of the virtual axis R1 in the adjusted pose data PD1 by lowering a differential angle θ1. In other words, the pose transform matrix TM1 in this example includes the displacement DIS1 and a reduction of the angle θ1.

In some embodiments, the pose translator 182 can be implemented by program instruction codes executed by the processing unit 180 or an application specific integrated circuit.

Figure 6B:
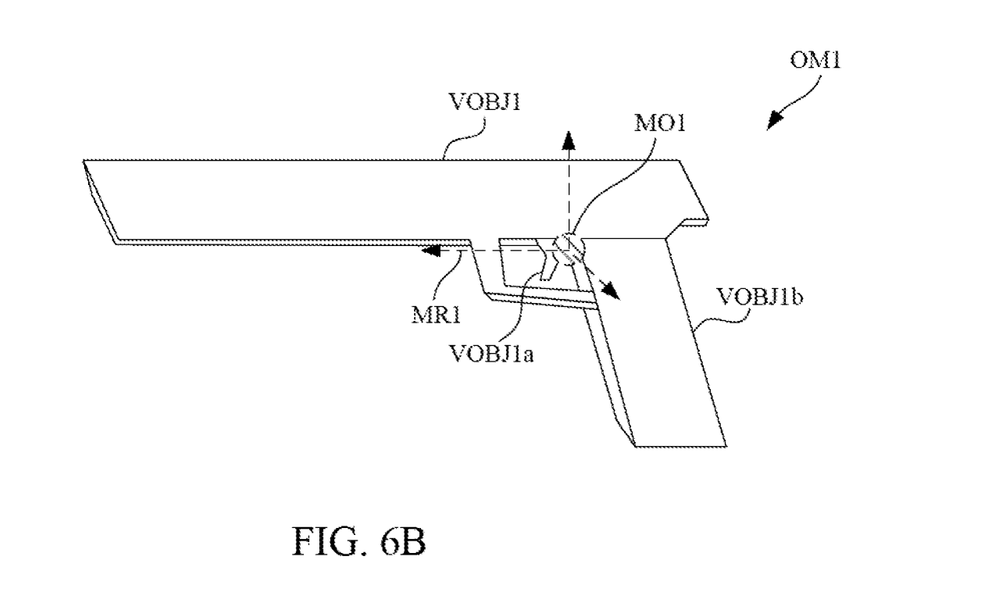
FIG. 6B is a schematic diagram illustrating a virtual object model about a pistol-shaped virtual object corresponding to the trigger oriented mode.

Reference is further made to FIG. 6B, which is a schematic diagram illustrating a virtual object model OM1 about a pistol-shaped virtual object VOBJ1 corresponding to the trigger oriented mode M1. In step S251, the graphic renderer 186 is configured to render a pistol-shaped virtual object VOBJ1, under the current controller mode (i.e., the trigger oriented mode M1) in the immersive content IMC, according to the adjusted pose data PD1.

In some embodiments, the adjusted pose data PD1 shown in FIG. 6A is configured to define the position about the virtual origin O1 of the pistol-shaped virtual object VOBJ1 and the orientation about the virtual axis R1 of the pistol-shaped virtual object VOBJ1. As shown in FIG. 6B, the virtual object model OM1 defines the pistol-shaped virtual object VOBJ1, which includes a pistol trigger portion VOBJ1a and a pistol grip portion VOBJ1b. The virtual object model OM1 includes a model origin MO1 and a model axis MR1.

In step S251, the graphic renderer 186 is configured to align the model origin MO1 with the virtual origin O1 in the adjusted pose data PD1, and align the model axis MR1 with the virtual axis R1 in the adjusted pose data PD1, so as to render the pistol-shaped virtual object VOBJ1 according to the adjusted pose data PD1.

In some embodiments, the virtual object model OM1 is designed by a software provider of application programs (e.g., a shooting game, a fighting game, a virtual travel experience, a social networking experience). As shown in FIG. 6B, the virtual object model OM1 can be designed in accordance with the model origin MO1 and the model axis MR1. The model origin MO1 is adjacent to a center of the virtual object model OM1, and also adjacent to the pistol trigger portion VOBJ1a. The model axis MR1 of the virtual object model OM1 points to a shooting direction of the pistol-shaped virtual object VOBJ1. In this case, it is easier for the software provider of application programs to design the virtual object model OM1 in reference with the model origin MO1 and the model axis MR1, without worrying about the actual raw pose data PDraw detected by the tracking device 160.

In this case, the immersive system 100 will help to convert the raw pose data PDraw into the adjusted pose data PD1, and the pistol-shaped virtual object VOBJ1 (in the shape of the virtual object model OM1) can be rendered according to the adjusted pose data PD1.

In the embodiments shown in FIG. 6A and FIG. 6B, the virtual object model includes a virtual pistol corresponding to the trigger oriented mode M1. However, the disclosure is not limited thereto. The virtual object model can also include a virtual rifle or a virtual bow (or any equivalent object operable through a trigger) corresponding to the trigger oriented mode M1.

Figure 7A:
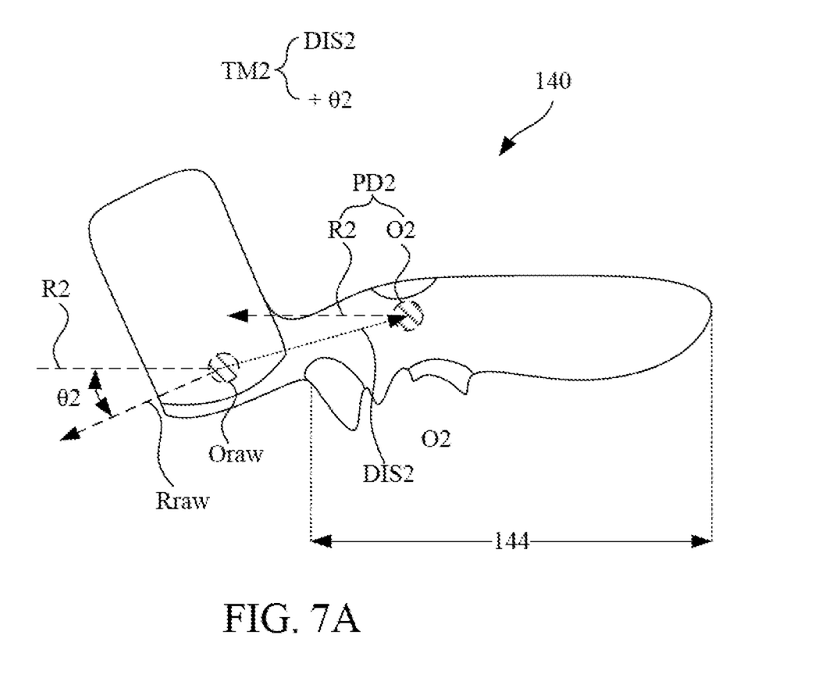
FIG. 7A is a schematic diagram illustrating the pose transform matrix corresponding to the handle oriented mode in some embodiments of the disclosure.

As shown in FIG. 2 and FIG. 5, if the current controller mode is the handle oriented mode M2, the step S232 is executed, and the mode selector 184 of the processing unit 180 selects the pose transform matrix TM2 corresponding to the handle oriented mode M2. Reference is further made to FIG. 7A. FIG. 7A is a schematic diagram illustrating the pose transform matrix TM2 corresponding to the handle oriented mode M2 in some embodiments of the disclosure. As shown in FIG. 5 and FIG. 7A, in step S242, the pose translator 182 is configured to apply the pose transform matrix TM2 onto the raw pose data PDraw (including the tracking origin Oraw and the tracking axis Rraw), so as to translate the raw pose data PDraw into adjusted pose data PD2, which include a virtual origin O2 and a virtual axis R2. The target pose transform matrix TMc (i.e., the pose transform matrix TM2 in this case) is configured to convert the position of the tracking origin Oraw within the raw pose data PDraw into another position of the virtual origin O2 in the adjusted pose data by shifting a displacement DIS2, and also convert the orientation of the tracking axis Rraw in the raw pose data PDraw into another orientation of the virtual axis R2 in the adjusted pose data PD2 by raising a differential angle 82. In other words, the pose transform matrix TM2 in this example includes the displacement DIS2 and a lifting of the angle 82.

Figure 7B:
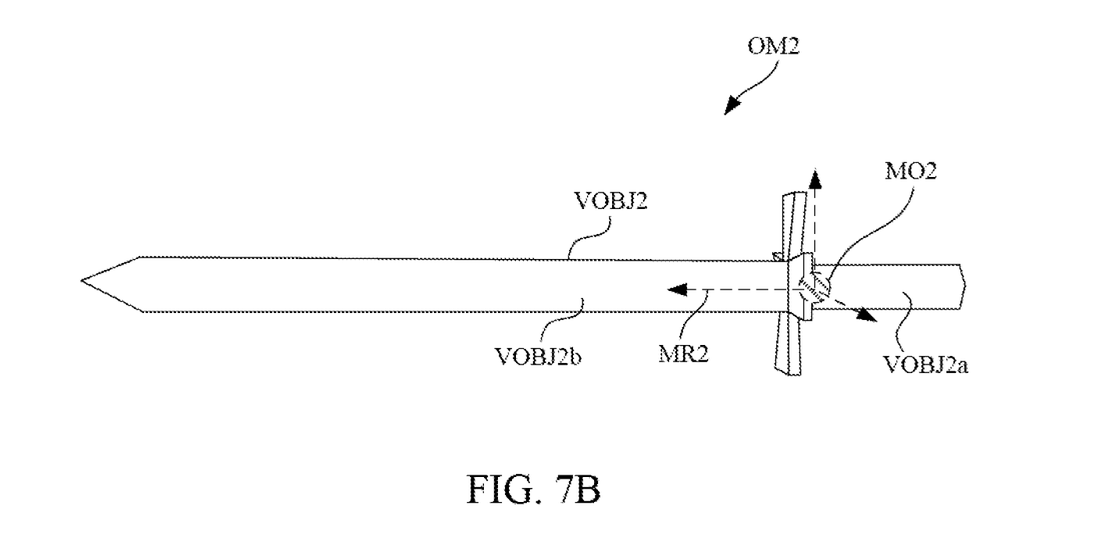
FIG. 7B is a schematic diagram illustrating a virtual object model about a sword-shaped virtual object corresponding to the handle oriented mode.

Reference is further made to FIG. 7B, which is a schematic diagram illustrating a virtual object model OM2 about a sword-shaped virtual object VOBJ2 corresponding to the handle oriented mode M2. In step S252, the graphic renderer 186 is configured to render a sword-shaped virtual object VOBJ2, under the current controller mode (i.e., the handle oriented mode M2) in the immersive content IMC, according to the adjusted pose data PD2.

In some embodiments, the adjusted pose data PD2 shown in FIG. 7A is configured to define the position about the virtual origin O2 of the sword-shaped virtual object VOBJ2 and the orientation about the virtual axis R2 of the sword-shaped virtual object VOBJ2. As shown in FIG. 7B, the virtual object model OM2 defines the sword-shaped virtual object VOBJ2, which includes a sword handle portion VOBJ2a and a sword blade portion VOBJ2b. The virtual object model OM2 includes a model origin MO2 and a model axis MR2.

In step S252, the graphic renderer 186 is configured to align the model origin MO2 with the virtual origin O2 in the adjusted pose data PD2, and align the model axis MR2 with the virtual axis R2 in the adjusted pose data PD2, so as to render the sword-shaped virtual object VOBJ2 according to the adjusted pose data PD2.

In some embodiments, the virtual object model OM2 is designed by a software provider of application programs. As shown in FIG. 7B, the virtual object model OM2 can be designed in accordance with the model origin MO2 and the model axis MR2. The model origin MO2 is located between the sward handle and the sward blade. The model axis MR2 of the virtual object model OM2 points along a blade extension direction of the sword-shaped virtual object VOBJ2. In this case, it is easier for the software provider of application programs to design the virtual object model OM2 in reference with the model origin MO2 and the model axis MR2, without worrying about the actual raw pose data PDraw detected by the tracking device 160.

In this case, the immersive system 100 will help to convert the raw pose data PDraw into the adjusted pose data PD2, and the sword-shaped virtual object VOBJ2 (in the shape of the virtual object model OM2) can be rendered according to the adjusted pose data PD2.

In the embodiments shown in FIG. 7A and FIG. 7B, the virtual object model includes a virtual sword corresponding to the handle oriented mode M2. However, the disclosure is not limited thereto. The virtual object model can also include a virtual stick, a virtual dagger or a virtual bar (or any equivalent object) corresponding to the handle oriented mode M2.

Figure 8A:
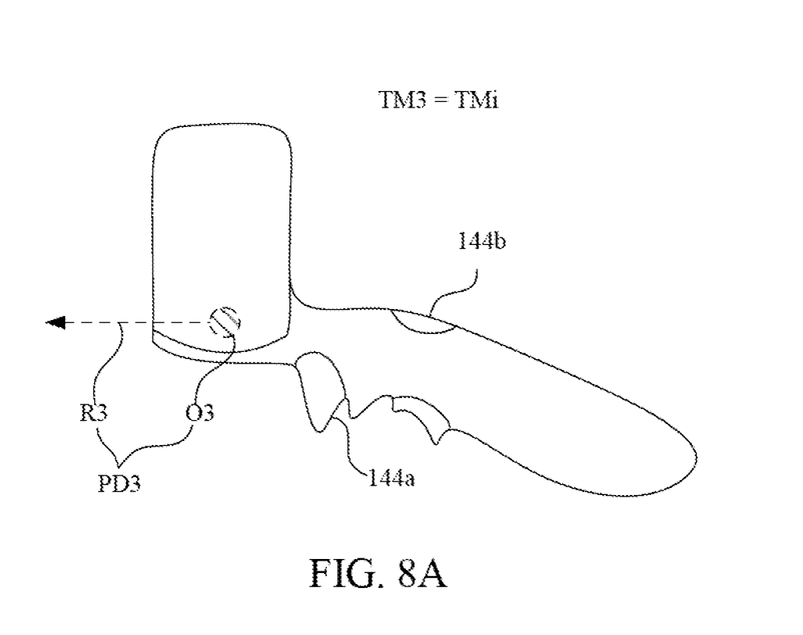
FIG. 8A is a schematic diagram illustrating the pose transform matrix corresponding to the panel oriented mode in some embodiments of the disclosure.

As shown in FIG. 2 and FIG. 5, if the current controller mode is the panel oriented mode M3, the step S233 is executed, and the mode selector 184 of the processing unit 180 selects the pose transform matrix TM3 corresponding to the handle oriented mode M3. Reference is further made to FIG. 8A. FIG. 8A is a schematic diagram illustrating the pose transform matrix TM3 corresponding to the panel oriented mode M3 in some embodiments of the disclosure. As shown in FIG. 5 and FIG. 8A, in step S243, the pose translator 182 is configured to apply the pose transform matrix TM3 onto the raw pose data PDraw (including the tracking origin Oraw and the tracking axis Rraw), so as to translate the raw pose data PDraw into adjusted pose data PD3, which include a virtual origin O3 and a virtual axis R3. In this embodiment, the adjusted pose data PD3 can be equal to the raw pose data PDraw, and the pose transform matrix TM3 can be an identity translation matrix. In other words, the raw pose data PDraw can be directly outputted as the adjusted pose data PD3.

Figure 8B:
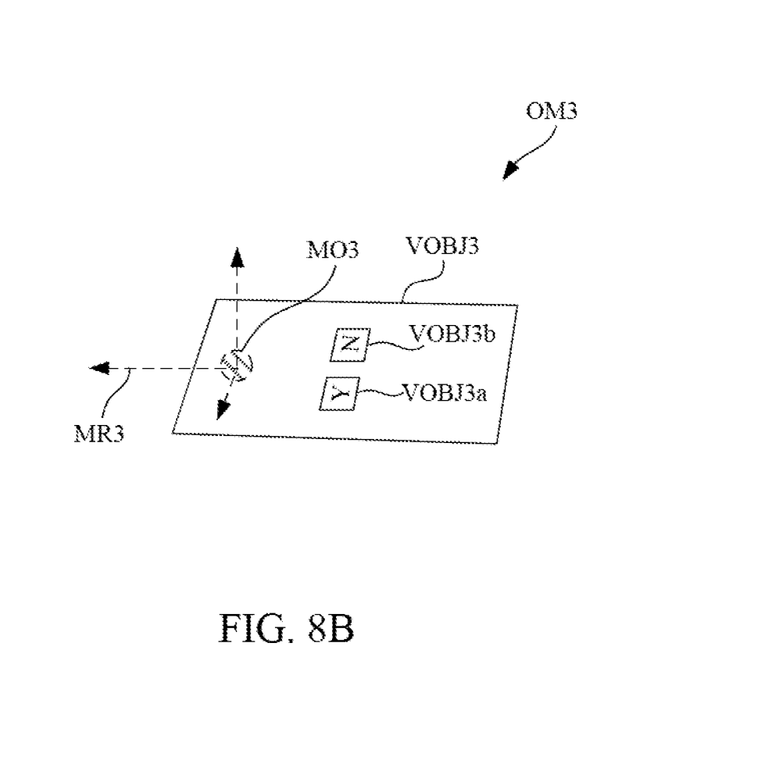
FIG. 8B is a schematic diagram illustrating a virtual object model about a virtual touch panel object corresponding to the panel oriented mode.

Reference is further made to FIG. 8B, which is a schematic diagram illustrating a virtual object model OM3 about a virtual touch panel object VOBJ3 corresponding to the panel oriented mode M3. In step S253, the graphic renderer 186 is configured to render the touch panel virtual object VOBJ3, under the current controller mode (i.e., the panel oriented mode M3) in the immersive content IMC, according to the adjusted pose data PD3. As shown in FIG. 8B, the touch panel virtual object VOBJ3 includes virtual buttons VOBJ3a and VOBJ3b, which can be operated by the user U1 through the touch panel 144b disposed on the controller 140 (as shown in FIG. 8B).

In the embodiments shown in FIG. 8A and FIG. 8B, the virtual object model includes a virtual touch panel corresponding to the panel oriented mode M3. However, the disclosure is not limited thereto. The virtual object model can also include a virtual keyboard or a virtual button interface corresponding to the panel oriented mode (or any equivalent object) corresponding to the panel oriented mode M3.

Based on aforesaid embodiments, the software provider of application programs is able to design different virtual object models respectively for different controller modes, without worrying about the actual raw pose data detected by the tracking device. The immersive system 100 and the control method 200 will convert the raw pose data into different adjusted pose data, and these adjusted pose data are optimized for individual controller modes. In this case, when the tracking manner is advised or updated (e.g., the definitions of the raw pose data are changed), the software provider of application programs are not required to update every virtual object models. The immersive system 100 and the control method 200 can help to convert the raw pose data into the adjusted pose data after the updating.

A non-transitory computer-readable storage medium is also disclosed. The non-transitory computer-readable storage medium stores at least one instruction program executed by a processor (e.g., the processing unit 160) to perform a control method 200 shown in FIG. 3 and FIG. 5. The non-transitory computer-readable storage medium can be implemented by the storage unit 190 shown in FIG. 1 and FIG. 2.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A control method, comprising:
    tracking raw pose data of a controller configured to operate in one of a plurality of controller modes;
    determining a current controller mode among the controller modes;
    selecting a target pose transform matrix, from a plurality of pose transform matrices, according to the current controller mode, wherein each of the pose transform matrices is provided corresponding to one of the controller modes respectively;
    applying the target pose transform matrix onto the raw pose data to generate adjusted pose data; and
    rendering a virtual object, under the current controller mode in an immersive content, according to the adjusted pose data.

2. The control method of claim 1, wherein the controller is movable within a spatial area, the raw pose data is configured to define a first position about a tracking origin of the controller and a first orientation about a tracking axis of the controller observed by a tracking device, the raw pose data is tracked in view of the tracking device relative to the spatial area.

3. The control method of claim 2, wherein the position of the tracking origin and the tracking orientation is determined according to an appearance feature of the controller.

4. The control method of claim 2, wherein the virtual object is movable in the immersive content in correspondence with the controller in the spatial area, the adjusted pose data is configured to define a second position about a virtual origin of the virtual object and a second orientation about a virtual axis of the virtual object.

5. The control method of claim 4, wherein the target pose transform matrix is configured to convert the first position within the raw pose data into the second position in the adjusted pose data and convert the first orientation in the raw pose data into the second orientation in the adjusted pose data.

6. The control method of claim 1, wherein the virtual object is rendered based on one of a plurality of virtual object models corresponding to the controller modes, the controller modes comprises at least one of a panel oriented mode, a trigger oriented mode and a handle oriented mode.

7. The control method of claim 6, wherein the virtual object models comprises a virtual touch panel, a virtual keyboard or a virtual button interface corresponding to the panel oriented mode.

8. The control method of claim 6, wherein the virtual object models comprises a virtual pistol, a virtual rifle or a virtual bow corresponding to the trigger oriented mode.

9. The control method of claim 6, wherein the virtual object models comprises a virtual sward, a virtual stick, a virtual dagger or a virtual bar corresponding to the handle oriented mode.

10. An immersive system, comprising:
    a controller, configured to operate in one of a plurality of controller modes;
    a tracking device, configured for tracking raw pose data of the controller;
    a processing unit, communicated with the tracking device, configured to:
        determine a current controller mode among the controller modes;
        select a target pose transform matrix from a plurality of pose matrices according to the current controller mode, wherein each of the pose matrices is provided corresponding to one of the controller modes respectively;
        apply the target pose transform matrix onto the raw pose data to generate adjusted pose data; and
        render a virtual object, under the current controller mode in an immersive content, according to the adjusted pose data.

11. The immersive system of claim 10, wherein the controller is movable within a spatial area, the raw pose data is configured to define a first position about a tracking origin of the controller and a first orientation about a tracking axis of the controller observed by a tracking device in the spatial area, the raw pose data is tracked in view of the tracking device relative to the spatial area.

12. The immersive system of claim 11, wherein the position of the tracking origin and the tracking orientation is determined according to an appearance feature of the controller.

13. The immersive system of claim 11, wherein the virtual object is movable in the immersive content in correspondence with the controller in the spatial area, the adjusted pose data is configured to define a second position about a virtual origin of the virtual object and a second orientation about a virtual axis of the virtual object.

14. The immersive system of claim 13, wherein the target pose transform matrix is configured to convert the first position within the raw pose data into the second position in the adjusted pose data and convert the first orientation in the raw pose data into the second orientation in the adjusted pose data.

15. The immersive system of claim 10, wherein the controller comprises a handheld controller, the controller modes corresponds to a plurality of hand gestures for operating the handheld controller.

16. The immersive system of claim 10, wherein the virtual object is rendered based on one of a plurality of virtual object models corresponding to the controller modes, the controller modes comprises at least one of a panel oriented mode, a trigger oriented mode and a handle oriented mode.

17. The immersive system of claim 16, wherein the virtual object models comprises a virtual touch panel, a virtual keyboard or a virtual button interface corresponding to the panel oriented mode.

18. The immersive system of claim 16, wherein the virtual object models comprises a virtual gun or a virtual bow corresponding to the trigger oriented mode.

19. The immersive system of claim 16, wherein the virtual object models comprises a virtual sward, a virtual stick, a virtual dagger or a virtual bar corresponding to the handle oriented mode.

20. A non-transitory computer-readable storage medium, storing at least one instruction program executed by a processor to perform a control method, the control method comprising:

tracking raw pose data of a controller configured to operate in one of a plurality of controller modes;

determining a current controller mode among the controller modes;

selecting a target pose transform matrix, from a plurality of pose transform matrices, according to the current controller mode, wherein each of the pose transform matrices is provided corresponding to one of the controller modes respectively;

applying the target pose transform matrix onto the raw pose data to generate adjusted pose data; and rendering a virtual object, under the current controller mode in an immersive content, according to the adjusted pose data.

\* \* \* \* \*